United States Patent Office 3,464,963
Patented Sept. 2, 1969

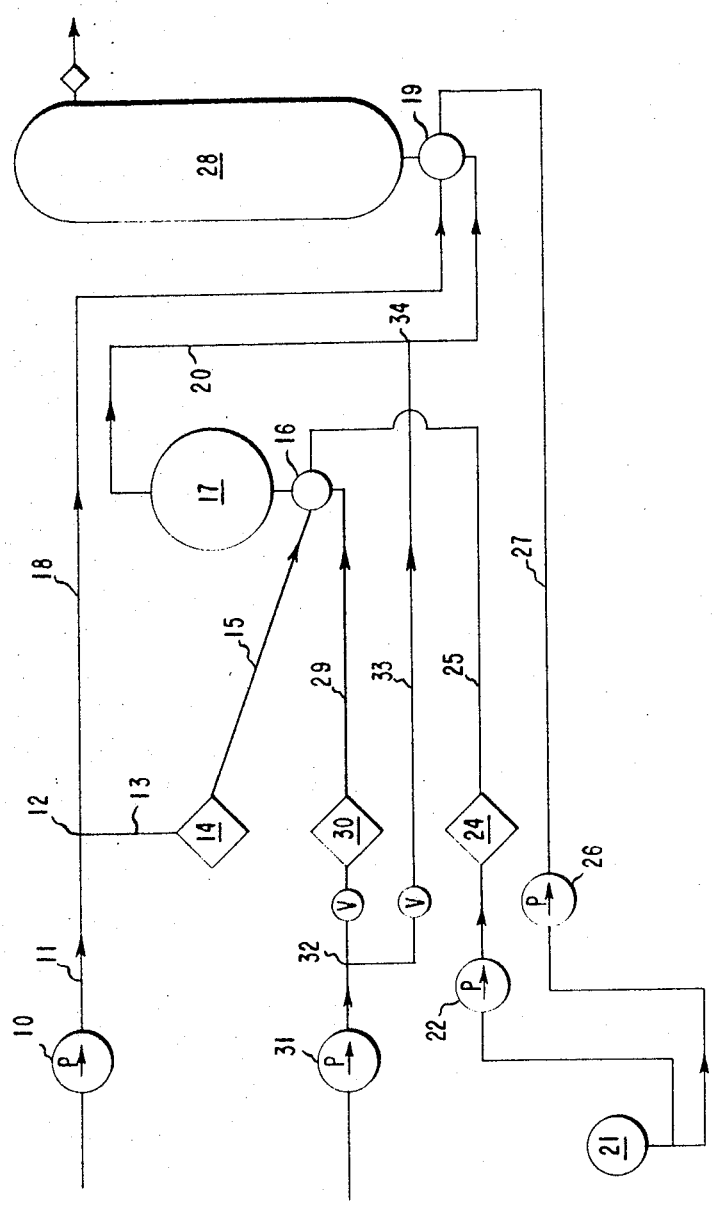

3,464,963
PROCESS FOR POLYMERIZING VINYL
FLUORIDE
James Lee Hecht, Williamsville, and Charles T. Hughes, Grand Island, N.Y., assignors to E. I. du Pont de Nemours and Company, Wilmington, Del., a corporation of Delaware
Filed Aug. 26, 1964, Ser. No. 392,145
Int. Cl. C08f 1/06, 3/22
U.S. Cl. 260—92.1                                    1 Claim

ABSTRACT OF THE DISCLOSURE

A process is provided for polymerizing vinyl fluoride in an aqueous reaction medium of vinyl fluoride, water and a water-soluble, free radical generating initator wherein a portion of the aqueous reaction medium is nucleated in a first reaction zone until no more than 1% solids are formed and the nucleated portion of the aqueous reaction medium is then combined with the remaining portion thereof followed by subjecting the modified reaction medium to polymerization in a second reaction zone.

---

This invention relates to improved processes for the preparation of polyvinyl fluoride and more particularly to two stage polymerization processes for the preparation of polyvinyl fluoride.

Polyvinyl fluoride film possesses an unusual combination of excellent resistance to outdoor weathering exposures, a high degree of physical toughness, chemical inertness, abrasion resistance, resistance to soiling and the action of solvents as well as an amazing retention of these properties at both low and elevated temperatures. The above combination of properties not only strongly suggests many areas of use for polyvinyl fluoride films, but also the use of such films as the outer layers of a wide variety of laminar structures destined chiefly for outdoor use. The polyvinyl fluoride films serve to upgrade less functional substrates, imparting to the final structure a degree of utility not to be found solely in either film or substrate.

In any continuous process, producibilty of high quality material over long and sustained production runs is requisite if the process is to be operated economically and the final product is to meet commercial quality specifications. Heretofore, in the one-stage continuous process for the polymerization of polyvinyl fluoride, polymer species formed during aqueous phase polymerization are known to have poor thermal stability, and consequently, relatively lower weatherability of the final self-supporting film.

It is, therefore, an object of this invention to provide an improved polymerization process for the preparation of polyvinyl fluoride which results in a film having enhanced weatherability.

A further object of this invention is to provide a two-stage polymerization process for the preparation of polyvinyl fluoride.

It is a further object of this invention to provide a two-stage polymerization process for the preparation of polyvinyl fluoride which controls particle nucleation and polymer species formed during aqueous phase polymerization. These and other objects will appear hereinafter.

The objects and advantages of the invention are accomplished by the two-stage rate controlling process which comprises nucleating polyvinyl fluoride particles in a first reaction zone for a sufficient time until the particle nucleation becomes non-rate limiting and then polymerizing the bulk of the vinyl fluoride in a second reaction zone.

The invention can be best understood by referring to the drawing which shows a flow diagram for the two stage vinyl fluoride polymerization process. In the drawing, filtered, deionized, substantially deoxygenated water containing a water-soluble reaction initiator is continuously fed through pump 10, maintained at a pressure of 300 to 500 p.s.i.g. higher than reactor 28, and line 11 to a point 12 where from about 25–50% of the stream is diverted through line 13, fed through heat exchanger 14 preferably maintained at a temperature substantially that of reactor 17 and then through line 15 to mixer 16 where it is joined with water and vinyl fluoride monomer prior to being introduced into nucleation reactor 17 maintained at a pressure of 1,500 to 9,000 p.s.i.g. and a temperature within the range of 60 to 90° C. The remainder of the initiator stream passes through line 18 to mixer 19 where it joins the vinyl fluoride monomer and water not sent to the nucleation reactor and the nucleated polyvinyl fluoride stream 20 from nucleation reactor 17.

Twenty-five to fifty percent of the vinyl fluoride monomer in storage vessel 21 is continuously fed under a pressure of 300 to 500 p.s.i.g. higher than reactor 28 supplied by pump 22 through line 23 to heat exchanger 24 maintained at a temperature substantially that of reactor 17; thence through line 25 to mixer 16 where initiator stream 15 and medium stream 25 are mixed prior to entrance to reactor 17. The remainder of the vinyl fluoride monomer is fed by pump 26 through line 27 directly to mixer 19 prior to entrance into bulk polymerizer 28 maintained at a pressure of 4,000 to 14,000 p.s.i.g. and a temperature of 90 to 140° C.

Water is supplied to mixer 16 from line 29 after passing through heat exchanger 30 maintained at a temperature substantially that of prereactor 17. Pump 31 feeds the water at a pressure that of reactor 28 to point 32 where 25–50 percent of the water proceeds to nucleating reactor 17 through line 29 while the remaining water is fed through line 33 to a point 34 in the nucleated polyvinyl fluoride stream 20 from reactor 17 where it is combined with the nucleated polyvinyl fluoride stream. The combined stream joins monomer stream 27 and initiator stream 18 at mixer 19 and thus to polymerizer 28 where the bulk of the polymerization is completed.

It has been found by the present invention that during the polymerization the polymer particles, once formed, act as the locus of the reaction. At the start of the reaction, there are no polymer particles. The vinyl fluoride dissolved in water reacts with the initiator to give a free radical which polymerizes in the aqueous phase until at some point a particle is formed. This particle then acts as the site for further reaction by virtue of the fact that the reaction proceeds much more rapidly on the particle. Initially, the rate of reaction is slow because there are no polymer particles. As particles are formed, i.e., nucleated, the more rapid reaction takes place on particles themselves and the rate increases until it levels off at the reaction rate for the conditions involved. At this point, there is sufficient particle surface and the reaction rate is limited by the chemical reaction itself.

In a continuous polymerization, polymer particles are being continuously removed; thus, at steady state conditions, new particles must be continuously nucleated.

The conditions which favor nucleation are quite different from those which favor the polymerization. By the present invention it has been found that the best method for continuously polymerizing vinyl fluoride is to nucleate in one reactor and to carry out the bulk polymerization in the second reactor.

To make the particle nucleation non-rate limiting for the subsequent polymerization, the conditions for the aqueous phase system with a water soluble initiator and vinyl fluoride are as follows: broadly, the particle nucleation can take place within 15 seconds to five minutes, at 60–90° C. and 1,500 to 9,000 p.s.i. Raising the temperature of the system decreases the rate of particle nucleation; therefore, lower temperatures produce more nucleation in a shorter time. The particle nucleation step should produce as much nucleation as practical, i.e. number of particles, to make nucleation non-rate limiting. On a practical basis, it is only necessary to produce less than about one percent of the total polymer ultimate basis. There is little polymerization at the particle nucleation conditions. The desired holdup time for the particle nucleation is determined by the rate of reaction at constant conditions in the second reaction, bulk polymerization. The particle nucleation step decreases the relative proportion of polymer formed by the aqueous phase polymerization thereby resulting in improved inherent weatherability of the final polyvinyl fluoride film.

To bulk polymerize the balance of the vinyl fluoride after particle nucleation, the optimum will be at the temperature at which most of the polymer is made. At the higher temperatures, a higher molecular weight polymer is produced which will provide a final film of greater inherent weatherability.

The optimum bulk polymerization conditions should be within 90–140° C. at 4,000 to 14,000 p.s.i. for sufficient time to produce the optimum yield or about .5–15 minutes. Polymerization rates increase with increasing temperature.

The vinyl fluoride monomer can be prepared by the hydrofluorination of acetylene according to the process described in U.S. Patent 2,118,901. The monomer can also be prepared by the dehydrofluorination of 1,1-difluoroethane using any of the processes described in U.S. Patents 2,480,560; 2,599,631 and 2,674,632.

Water-soluble reaction initiators useful in the process include those free radical generating catalysts in the following list: water-soluble salts of inorganic per acids, e.g., ammonium persulfate, potassium persulfate, potassium perphosphate, potassium percarbonate; organic peroxides which contain hydrophyllic groupings of sufficient effect to render them water-soluble, e.g., beta, beta'-bis-carboxypropionyl peroxide, t-butyl hydrogen peroxide; alkali metal salts of carboxylic azonitriles of the types described in U.S. Patent 2,520,338, e.g., alpha, alpha'-azobis(alpha-methyl-gamma-carboxybutyronitrile), alpha, alpha'-azobis(alpha, gamma, gamma-trimethyl-gamma-carboxybutyronitrile), alpha, alpha'-azobis(alpha-methyl - gamma-phenyl-gamma-carboxybutyronitrile), alpha, alpha'-azobis(alpha - propyl-gamma-carboxybutyronitrile), alpha, alpha' - azobis(alpha, gamma-dimethyl-gamma-carboxyvaleronitrile); and inorganic acid salts of azoamidines of the types described in U.S. Patent 2,599,299, e.g., the dihydrochlorides of 2,2' - diguanyl - 2,2'-azopropane, 2,2'-diguanyl-2,2'-azobutane, 2,2'-bis(N-phenylguanyl)-2,2'-azopropane, 2,2'-bis(N,N-diethyl guanyl)-2,2' - azopropane and 2,2'-bis(N-hydroxyethylguanyl)-2,2'-azopropane. The preferred reaction initiator is 2,2'-diguanyl-2,2'-azopropane dihydrochloride.

The rate controlling role of a nucleation reactor is illustrated in Table I. Four identical runs are made, except for the time spent at nucleating conditions, with a vinyl fluoride aqueous phase system containing 0.01% 2,2'-diguanyl-2,2'-azopropane initiator.

TABLE I

| Run No. | Nucleation time at 77° C. and 8,500 p.s.i. (min.) | Polymerization time at 97° C. and 8,000 p.s.i. (min.) | Polymer Wt. (gms.) |
| --- | --- | --- | --- |
| 1 | 0 | 15 | 19 |
| 2 | 2 | 15 | 34 |
| 3 | 5 | 15 | 72 |
| 4 | 15 | 0 | 3 |

These runs show that when particle nuclei are formed at a low temperature prior to carrying out the bulk polymerization at the higher temperature, the reaction rate increases 2–3 fold; while Run 5 shows little polymerization at the nucleating condition itself.

Thus, the continuous polymerization of vinyl fluoride should utilize two reactions for a higher molecular weight product: first, for particle nucleation, second, for bulk polymerization.

The invention can be best understood by referring to the following examples.

Examples 1 and 2

In the examples, the equipment shown in the accompanying drawing is used. The process conditions are shown in Table II. In both examples and in both controls the initiator is 1560 p.p.m. 2,2'-diguanyl-2,2'-azopropane dihydrochloride in water of the rate of 30–34#/hr.

TABLE II

|  | Control 1 | Control 2 | Example 1 | Example 2 |
| --- | --- | --- | --- | --- |
| Aqueous phase rate (lb./hr.) | 605 | 605 | 740 | 725 |
| Monomer (VF) rate (lb./hr.) | 65 | 65 | 85 | 100 |
| Pre-reactor temp. (° C.) |  |  | 79 | 80 |
| Residence time in pre-reactor (min.) |  |  | 2.0 | 1.6 |
| Pre-reactor pressure (p.s.i.) |  |  | 8,500 | 8,500 |
| Percent solids exit pre-reactor |  |  | 0.1 | 0.05 |
| Polymer produced in pre-reactor (lb./hr.) |  |  | 0.5 | 0.3 |
| Reactor temp. (° C.) | 97 | 97 | 97 | 97 |
| Reactor pressure (p.s.i.) | 8,000 | 8,000 | 8,000 | 8,000 |
| Polymer produced (lb./hr.) | 43 | 44 | 58 | 62 |
| Inherent viscosity ($\eta$ inh.) | 1.14 |  | 1.47 |  |

Films are prepared from the polymer obtained from Controls 1 and 2 and Examples 1 and 2 in accordance with the procedures of Bartron U.S. Patent 2,953,818 and Prengle and Richards, U.S. Patent 3,139,470.

These films are tested for accelerated weatherability expressed as $FS-O_3$ life. The accelerated weatherability of a particular polyvinyl fluoride is expressed as the number of hours that molecularly unoriented film prepared therefrom must be exposed to intense ultraviolet irradiation in a gaseous oxidative atmosphere at a temperature elevated above normal room temperatures before its elongation-at-break, expressed as a percent of the original length of the test specimen, is reduced to a value of less than 10%. The accelerated exposures are carried out in a test device containing 20 Westinghouse FS–20–T–12 fluorescent sun lamps sealed except for inlet and outlet bleeds for fresh air and ozone at 250 parts per million at a rate of 200 cubic feet per minute.

Polymer:                                    Weatherability (hrs.)
    Control 2 _____ 440
    Example 2 _____ 540

It is seen that an improvement of about 20% in accelerated weatherability is obtained.

Polymer:                                    Weatherability (hrs.)
    Control 1 _____ 460
    Example 1 _____ 545

An improvement of about 20% in accelerated weatherability over Control 1 is observed; therefore higher inherent weatherability of polyvinyl fluoride is attained through the use of two-stage polymerization.

Also observed is about a 40% increase in the spacetime yield factor.

Nucleated polymers show an increase of about 20% in accelerated weatherability over the non-nucleated controls. Optimizing conditions for particle nucleation with subsequent bulk polymerization show each has independent more favorable conditions.

Improved inherent weatherability will permit the use of thinner films in certain applications and will permit the use of additives which will give functionality to the film at some expense in weatherability.

The spacetime yields for nucleated polymer runs are about 40% greater than those with standard higher pressure runs producing polymer of the same quality. The polymer produced in the pre-reactor does not account for this since the pre-reactor accounts for less than 1% of the total polymer produced.

What is claimed is:

1. In the process for polymerizing vinyl fluoride in an aqueous reaction medium including water, vinyl fluoride and a water-soluble, free radical generating catalyst in a polymerization reactor maintained at a pressure of between about 4000 and about 14,000 p.s.i.g. and a temperature of between about 90 and about 140° C., the improvement comprising continuously nucleating between about 25% and about 50% by weight of said aqueous reaction medium in a first nucleating reactor maintained at a pressure of between about 1500 and about 9000 p.s.i.g. and a temperature of between about 60 and about 90° C. until no more than 1% total solids are formed and continuously combining said nucleated reaction medium with the remainder of said aqueous reaction medium in said polymerization reactor.

References Cited

UNITED STATES PATENTS

| | | | |
|---|---|---|---|
| 3,129,207 | 4/1964 | James | 260—92.1 |
| 3,245,972 | 4/1966 | Anderson et al. | 260—92.1 |
| 3,249,595 | 5/1966 | Pederer et al. | 260—92.1 |

JOSEPH L. SCHOFER, Primary Examiner

JOHN A. DONAHUE, JR., Assistant Examiner